(12) United States Patent
Kim et al.

(10) Patent No.: US 10,808,055 B2
(45) Date of Patent: Oct. 20, 2020

(54) MODIFIED CONJUGATED DIENE-BASED POLYMER AND METHOD FOR PREPARING THE SAME

(71) Applicant: LG Chem, Ltd., Seoul (KR)

(72) Inventors: Yu Jin Kim, Daejeon (KR); No Ma Kim, Daejeon (KR); Heung Yeal Choi, Daejeon (KR); Ho Young Lee, Daejeon (KR)

(73) Assignee: LG Chem, Ltd. (KR)

( * ) Notice: Subject to any disclaimer, the term of this patent is extended or adjusted under 35 U.S.C. 154(b) by 192 days.

(21) Appl. No.: 16/061,859

(22) PCT Filed: Oct. 18, 2017

(86) PCT No.: PCT/KR2017/011555
§ 371 (c)(1),
(2) Date: Jun. 13, 2018

(87) PCT Pub. No.: WO2018/097480
PCT Pub. Date: May 31, 2018

(65) Prior Publication Data
US 2018/0371125 A1    Dec. 27, 2018

(30) Foreign Application Priority Data

Nov. 23, 2016 (KR) .................. 10-2016-0156869
Jul. 25, 2017 (KR) .................. 10-2017-0094139

(51) Int. Cl.
| | | |
|---|---|---|
| *C08F 36/06* | (2006.01) | |
| *C08F 8/32* | (2006.01) | |
| *C07F 7/18* | (2006.01) | |
| *C08L 15/00* | (2006.01) | |
| *C08C 19/22* | (2006.01) | |
| *C08C 19/44* | (2006.01) | |
| *C07F 7/10* | (2006.01) | |
| *C08C 19/25* | (2006.01) | |
| *C08F 2/06* | (2006.01) | |
| *C08F 2/38* | (2006.01) | |
| *C08F 236/10* | (2006.01) | |
| *C08K 5/17* | (2006.01) | |
| *C08K 5/544* | (2006.01) | |
| *C08K 5/56* | (2006.01) | |
| *C08F 236/06* | (2006.01) | |
| *C08K 3/22* | (2006.01) | |

(52) U.S. Cl.
CPC ............ *C08F 36/06* (2013.01); *C07F 7/10* (2013.01); *C07F 7/1804* (2013.01); *C08C 19/22* (2013.01); *C08C 19/25* (2013.01); *C08C 19/44* (2013.01); *C08F 2/06* (2013.01); *C08F 2/38* (2013.01); *C08F 236/10* (2013.01); *C08K 5/17* (2013.01); *C08K 5/5442* (2013.01); *C08K 5/56* (2013.01); *C08L 15/00* (2013.01); *C08F 8/32* (2013.01); *C08F 236/06* (2013.01); *C08F 2500/01* (2013.01); *C08F 2500/04* (2013.01); *C08K 2003/2296* (2013.01)

(58) Field of Classification Search
CPC ...... C08F 36/06; C08F 136/06; C08F 236/06; C08F 8/30; C08F 8/32
See application file for complete search history.

(56) References Cited

U.S. PATENT DOCUMENTS

| | | | | |
|---|---|---|---|---|
| 3,678,013 A | * | 7/1972 | Mickler | ............... C08G 18/696 525/131 |
| 4,397,994 A | | 8/1983 | Takeuchi et al. | |
| 8,816,014 B2 | * | 8/2014 | Yoshida | ............... B60C 1/0016 525/332.9 |
| 9,725,527 B2 | * | 8/2017 | Lee | ............ C08C 19/25 |
| 10,508,157 B2 | * | 12/2019 | Lee | ............ C08K 5/56 |
| 2006/0004143 A1 | | 1/2006 | Inagaki et al. | |
| 2009/0005496 A1 | | 1/2009 | Maeda et al. | |
| 2010/0063202 A1 | | 3/2010 | Halasa et al. | |
| 2012/0277369 A1 | | 11/2012 | Yoshida et al. | |
| 2016/0009903 A1 | | 1/2016 | Morita et al. | |
| 2017/0058055 A1 | | 3/2017 | Lee et al. | |
| 2018/0312669 A1 | * | 11/2018 | Kang | ............ C08F 236/08 |
| 2019/0048104 A1 | * | 2/2019 | Son | ............ C08C 19/25 |

FOREIGN PATENT DOCUMENTS

| | | |
|---|---|---|
| CN | 1706874 A | 12/2005 |
| CN | 102482359 A | 5/2012 |
| CN | 105026440 A | 11/2015 |
| CN | 106068289 A | 11/2016 |
| EP | 2484701 A1 | 8/2012 |
| EP | 2963066 A1 | 1/2016 |

(Continued)

OTHER PUBLICATIONS

Chinese Search Report for Application No. 201780005852.1, dated Nov. 13, 2019, pp. 1-3.
Extended European Search Report for Application No. 17873365.5 dated Jan. 24, 2019, 11 pages.
Search report from International Application No. PCT/KR2017/011555, dated Jan. 24, 2018.

*Primary Examiner* — Rip A Lee

(74) *Attorney, Agent, or Firm* — Lerner, David, Littenberg, Krumholz & Mentlik, LLP

(57) ABSTRACT

The present invention relates to a modified conjugated diene-based polymer, and more particularly, provides a modified conjugated diene-based polymer which includes a repeating unit derived from a conjugated diene-based monomer and includes at one terminal, a functional group derived from a modifier which includes a compound represented by Formula 1, and a method for preparing the same.

20 Claims, No Drawings

(56) References Cited

FOREIGN PATENT DOCUMENTS

| | | | |
|---|---|---|---|
| JP | S57055912 A | 4/1982 | |
| JP | 2003155381 A * | 5/2003 | .............. C08L 15/00 |
| JP | 2003155381 A | 5/2003 | |
| JP | 5233440 B2 | 7/2013 | |
| JP | 2016017097 A | 2/2016 | |
| KR | 20120031206 A | 3/2012 | |
| KR | 20120058564 | 6/2012 | |
| KR | 20160057300 A | 5/2016 | |
| WO | 2011040212 A1 | 4/2011 | |
| WO | 2011040312 A1 | 4/2011 | |
| WO | 2016076549 A1 | 5/2016 | |

\* cited by examiner

MODIFIED CONJUGATED DIENE-BASED POLYMER AND METHOD FOR PREPARING THE SAME

CROSS-REFERENCE TO RELATED APPLICATIONS

The present application is a national phase entry under 35 U.S.C. § 371 of International Application No. PCT/KR2017/011555 filed Oct. 18, 2017, which claims priority from Korean Patent Application Nos. 10-2016-0156869, filed on Nov. 23, 2016, and 10-2017-0094139, filed on Jul. 25, 2017, the entire contents of which are incorporated herein by reference.

Technical Field

The present invention relates to a modified conjugated diene-based polymer, and more particularly, to a modified conjugated diene-based polymer having good exothermic properties, and excellent tensile strength, abrasion resistance and wet skid resistance by including a functional group derived from a modifier making excellent interaction with a rubber polymer and an inorganic filler, and a method for preparing the same.

Background Art

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, modified conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may also be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a binder such as a tin compound.

Meanwhile, carbon black and silica are being used as a reinforcing filler of a tire tread, wherein, if the silica is used as the reinforcing filler, low hysteresis loss and wet skid resistance may be improved. However, since the silica having a hydrophilic surface has a low affinity with a rubber in comparison to the carbon black having a hydrophobic surface, dispersibility may be poor, and thus, there is a need to use a separate silane coupling agent to improve the dispersibility or provide coupling between the silica and the rubber. Therefore, attempt of introducing a functional group having affinity or reactivity with silica into the terminal of a rubber molecule is being performed, but its effect is insufficient.

DISCLOSURE OF THE INVENTION

Technical Problem

The present invention has been devised to solve the above-mentioned problems of the conventional technique, and an object of the present invention is to provide a modified conjugated diene-based polymer which is modified from a modifier which makes excellent interaction with an inorganic filler when mixed therewith and has good exothermic properties and excellent tensile strength, abrasion resistance and wet skid resistance, and a method for preparing the same.

Technical Solution

To solve the above-described tasks, according to an embodiment of the present invention, there is provided a modified conjugated diene-based polymer including a repeating unit derived from a conjugated diene-based monomer and including at one terminal, a functional group derived from a modifier which includes a compound represented by the following Formula 1:

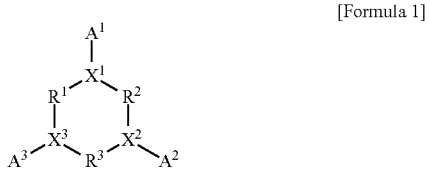

[Formula 1]

In Formula 1, $X^1$ to $X^3$ are each independently an N atom or $CR^{16}$, where one or more of $X^1$ to $X^3$ are required to be N atoms and $R^{16}$ is a hydrogen atom or a monovalent hydrocarbon group of 1 to 30 carbon atoms, $R^1$ to $R^3$ are each independently a single bond, or a divalent hydrocarbon group of 1 to 10 carbon atoms, and $A^1$ to $A^3$ are each independently nonexistent, or a functional group represented by the following Formula 1b, where one or more of $A^1$ to $A^3$ are required to be functional groups represented by the following Formula 1b:

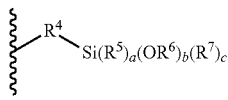

[Formula 1b]

In Formula 1b, $R^4$ is a single bond, or a divalent hydrocarbon group of 1 to 10 carbon atoms, $R^5$ and $R^6$ are each independently a monovalent hydrocarbon group of 1 to 30 carbon atoms, $R^7$ is a monovalent hydrocarbon group of 1 to 30 carbon atoms, or a functional group represented by the following Formula 1a, where one or more of $R^7$ are required to be functional groups represented by the following Formula 1a, and a is an integer of 0 or 1, b is an integer selected from 1 to 3, and c is an integer selected from 0 to 2, where a+b+c=3:

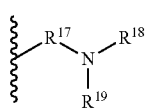

[Formula 1a]

In Formula 1a, $R^{17}$ is a divalent hydrocarbon group of 1 to 10 carbon atoms, and $R^{18}$ and $R^{19}$ are each independently a monovalent hydrocarbon group of 1 to 30 carbon atoms.

In addition, the present invention provides a method for preparing a modified conjugated diene-based polymer, including a step of polymerizing conjugated diene-based monomers, or a conjugated diene-based monomer and an aromatic vinyl-based monomer, in a hydrocarbon solvent which includes an organometal compound, to prepare an active polymer which is coupled with an organometal (S1); and a step of reacting the active polymer with a modifier which includes a compound represented by the following Formula 1 (S2):

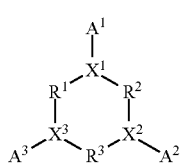

[Formula 1]

In Formula 1, the definition of each substituent is the same as defined above.

In addition, the present invention provides a modifier including the compound represented by Formula 1 above.

Advantageous Effects

According to the present invention, if a conjugated diene-based polymer is modified with a modifier making excellent interaction with an inorganic filler when mixed therewith, a functional group derived from the modifier is included in one terminal of the polymer, and thus, the preparation of a modified conjugated diene-based polymer making excellent interaction between a polymer and an inorganic filler is possible, and the modified conjugated diene-based polymer thus prepared has effects of good exothermic properties and excellent tensile strength, abrasion resistance and wet skid resistance.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The modified conjugated diene-based polymer according to the present invention includes a repeating unit derived from a conjugated diene-based monomer, and includes at one terminal, a functional group derived from a modifier which includes a compound represented by the following Formula 1:

[Formula 1]

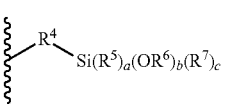

In Formula 1, $X^1$ to $X^3$ are each independently an N atom or $CR^{16}$, where one or more of $X^1$ to $X^3$ are required to be N atoms and $R^{16}$ is a hydrogen atom or a monovalent hydrocarbon group of 1 to 30 carbon atoms, $R^1$ to $R^3$ are each independently a single bond, or a divalent hydrocarbon group of 1 to 10 carbon atoms, and $A^1$ to $A^3$ are each independently nonexistent, or a functional group represented by the following Formula 1b, where one or more of $A^1$ to $A^3$ are required to be functional groups represented by the following Formula 1b:

[Formula 1b]

$$\{-R^4-Si(R^5)_a(OR^6)_b(R^7)_c\}$$

In Formula 1b, $R^4$ is a single bond, or a divalent hydrocarbon group of 1 to 10 carbon atoms, $R^5$ and $R^6$ are each independently a monovalent hydrocarbon group of 1 to 30 carbon atoms, $R^7$ is a monovalent hydrocarbon group of 1 to 30 carbon atoms, or a functional group represented by the following Formula 1a, where one or more of $R^7$ are required to be functional groups represented by the following Formula 1a, and a is an integer of 0 or 1, b is an integer selected from 1 to 3, and c is an integer selected from 0 to 2, where a+b+c=3:

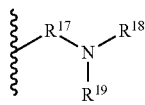

[Formula 1a]

In Formula 1a, $R^{17}$ is a divalent hydrocarbon group of 1 to 10 carbon atoms, and $R^{18}$ and $R^{19}$ are each independently a monovalent hydrocarbon group of 1 to 30 carbon atoms.

In a particular embodiment, in Formula 1, $X^1$ to $X^3$ may be each independently an N atom or $CR^{16}$, where two or more of $X^1$ to $X^3$ may be required to be N atoms, $R^1$ to $R^3$ may be divalent linear hydrocarbon groups of 1 to 5 carbon atoms, $A^1$ to $A^3$ may be each independently nonexistent, or a functional group represented by Formula 1b, where two or more of $A^1$ to $A^3$ may be required to be functional groups represented by Formula 1b, $R^4$ may be a single bond, or a divalent linear hydrocarbon group of 1 to 5 carbon atoms, $R^5$ and $R^6$ may be each independently a monovalent hydrocarbon group of 1 to 20 carbon atoms, $R^7$ may be a monovalent hydrocarbon group of 1 to 20 carbon atoms, or a functional group represented by Formula 1a, where two or more of $R^7$ may be required to be functional groups represented by Formula 1a above, $R^{16}$ may be a hydrogen atom or a monovalent hydrocarbon of 1 to 30 carbon atoms, a may be an integer of 0 or 1, b may be an integer selected from 1 to 3, and c may be an integer selected from 0 to 2, where a+b+c=3, and in Formula 1a, $R^{17}$ may be a divalent linear hydrocarbon group of 1 to 5 carbon atoms, and $R^{18}$ and $R^{19}$ may be each independently a monovalent hydrocarbon group of 1 to 20 carbon atoms.

In a more particular embodiment, in Formula 1, $X^1$ to $X^3$ may be each independently an N atom, $R^1$ to $R^3$ may be each independently a divalent hydrocarbon group of 1 to 3 carbon atoms, $A^1$ to $A^3$ may be each independently nonexistent, or a functional group represented by Formula 1b, where two or more of $A^1$ to $A^3$ may be required to be functional groups represented by Formula 1b, $R^4$ may be a single bond, $R^6$ may be each independently a monovalent hydrocarbon group of 1 to 10 carbon atoms, $R^7$ may be a functional group represented by Formula 1a, a may be 0, b may be an integer selected from 1 to 3, and c may be an integer selected from 0 to 2, where a+b+c=3, and in Formula 1a, $R^{17}$ may be a divalent linear hydrocarbon group of 1 to 5 carbon atoms, and $R^{18}$ and $R^{19}$ may be each independently a monovalent hydrocarbon group of 1 to 10 carbon atoms.

Meanwhile, if two or more of $A^1$ to $A^3$ are functional groups represented by Formula 1b, in each Formula 1b, $R^4$ to $R^7$ may be different from each other or the same, and in each Formula 1b, at least one of $R^7$ may introduce a functional group represented by Formula 1a.

In the present invention, the term "single bond" may mean a single covalent bond itself not including a separate atom or a molecular group.

In the present invention, the term "monovalent hydrocarbon group" may mean a monovalent atomic group in which carbon and hydrogen are bonded, such as a monovalent alkyl group, alkenyl group, alkynyl group, cycloalkyl group, cycloalkyl group including one or more unsaturated bonds, and aryl group, and the minimum carbon number of a substituent represented by the monovalent hydrocarbon group may be determined according to the kind of each substituent.

In the present invention, the term "divalent hydrocarbon group" may mean a divalent atomic group in which carbon and hydrogen are bonded, such as a divalent alkylene group, alkenylene group, alkynylene group, cycloalkylene group, cycloalkylene group including one or more unsaturated bonds, and arylene group, and the minimum carbon number of a substituent represented by the divalent hydrocarbon group may be determined according to the kind of each substituent.

According to an embodiment of the present invention, the compound represented by Formula 1 may be a compound represented by the following Formula 1-1, Formula 1-2 or Formula 1-3:

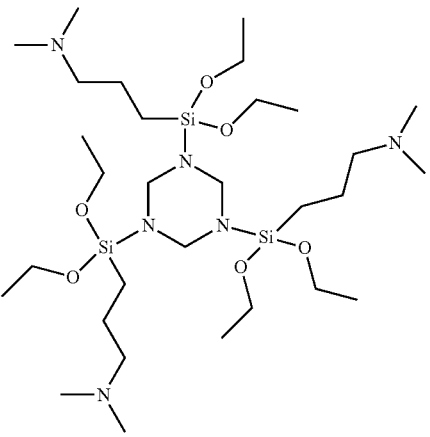

[Formula 1-1]

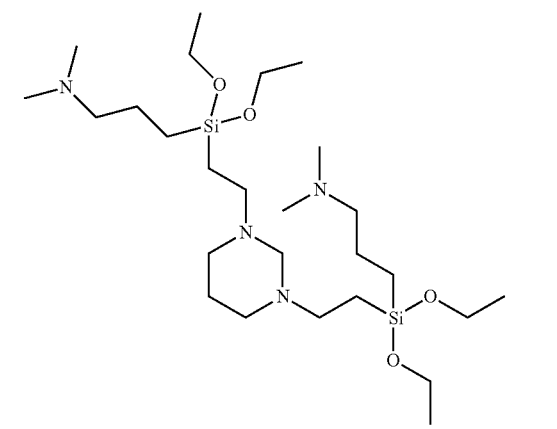

[Formula 1-2]

-continued

[Formula 1-3]

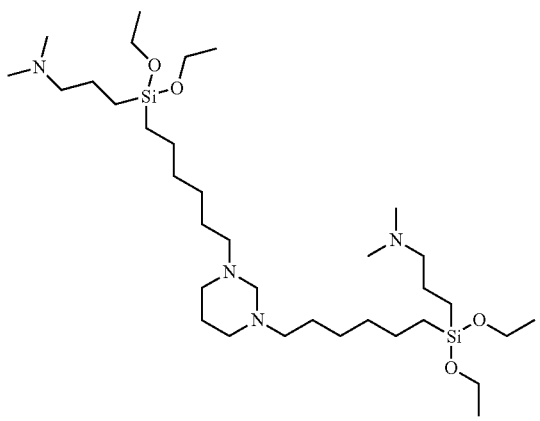

Meanwhile, the modified conjugated diene-based polymer may include a functional group derived from a modifier which includes a compound represented by Formula 1, at one terminal, and a functional group derived from a modification initiator which includes a compound represented by the following Formula 2, at the other terminal:

[Formula 2]

In Formula 2, $R^{20}$ and $R^{21}$ may be each independently one selected from the group consisting of an alkyl group of 1 to 20 carbon atoms, a cycloalkyl group of 3 to 20 carbon atoms, and an aralkyl group of 5 to 20 carbon atoms, or $R^{20}$ and $R^{21}$ may be combined with each other to form a saturated or unsaturated cyclic structure of 5 to 20 carbon atoms together with an adjacent N atom, where if $R^{20}$ and $R^{21}$ form a cyclic structure, a branched structure may be obtained, $R^{22}$ may be a single bond, an alkylene group of 1 to 20 carbon atoms, or one linker selected from the group consisting of the following Formula 3 to Formula 5, and M may be an alkali metal:

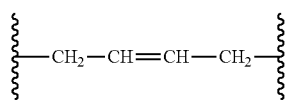

[Formula 3]

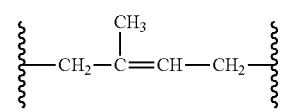

[Formula 4]

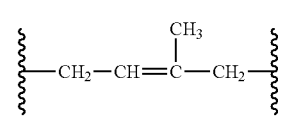

[Formula 5]

In a particular embodiment, in Formula 2, $R^{20}$ and $R^{21}$ may be each independently one selected from the group consisting of an alkyl group of 1 to 12 carbon atoms, a cycloalkyl group of 3 to 14 carbon atoms, and an aralkyl group of 5 to 20 carbon atoms, $R^{22}$ may be a single bond, an alkylene group of 1 to 20 carbon atoms, or one linker selected from the group consisting of Formula 3 to Formula 5 above, and M may be an alkali metal.

In a more particular embodiment, in Formula 2, $R^{20}$ and $R^{21}$ may be each independently methyl, ethyl, propyl, butyl, octyl, cyclopropyl, cyclohexyl, 3-phenyl-1-propyl, isobutyl, decyl, heptyl or phenyl, $R^{22}$ may be a single bond, an alkylene group of 2 to 16 carbon atoms, or one linker selected from the group consisting of Formula 3 to Formula 5 above, and M may be Li.

If a modification initiator is used as a polymerization initiator for initiating the polymerization of a conjugated diene-based polymer, the functional group derived from a modification initiator including the compound represented by Formula 2 may mean a functional group in a polymer, which is positioned at one terminal of a conjugated diene-based polymer and correspondent to a polymerization initiation part, and may achieve effects of increasing mechanical properties such as rolling resistance and wet skid resistance as well as improving the dispersibility and processability of a conjugated diene-based polymer.

The repeating unit derived from the conjugated diene-based monomer may mean a repeating unit formed by the conjugated diene-based monomer during polymerization, and the conjugated diene-based monomer may be, for example, one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (halo means halogen atom).

Meanwhile, a modified conjugated diene-based copolymer may be, for example, a copolymer further including a repeating unit derived from an aromatic vinyl monomer together with the repeating unit derived from the conjugated diene-based monomer.

The repeating unit derived from the aromatic vinyl monomer may mean a repeating unit formed by an aromatic vinyl monomer during polymerization, and the aromatic vinyl monomer may include, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

If the modified conjugated diene-based polymer is a copolymer including a repeating unit derived from an aromatic vinyl monomer, the modified conjugated diene-based polymer may include the repeating unit derived from the conjugated diene-based monomer in an amount of 50 to 95 wt %, 55 to 90 wt %, or 60 to 90 wt %, and the repeating unit derived from the aromatic vinyl monomer in an amount of 5 to 50 wt %, 10 to 45 wt %, or 10 to 40 wt %, and within the ranges, effects of excellent rolling resistance, wet skid resistance and abrasion resistance may be achieved.

According to an embodiment of the present invention, the copolymer may be a random copolymer, and in this case, effect of excellent balance between physical properties may be achieved. The random copolymer may mean repeating units which constitutes a copolymer, arranged in disorder.

The modified conjugated diene-based polymer according to an embodiment of the present invention may have a number average molecular weight (Mn) of 10,000 g/mol to 2,000,000 g/mol, 10,000 g/mol to 1,000,000 g/mol, or 100,000 g/mol to 500,000 g/mol, and a weight average molecular weight (Mw) of 10,000 g/mol to 5,000,000 g/mol, 10,000 g/mol to 3,000,000 g/mol, or 100,000 g/mol to 2,000,000 g/mol, and within the ranges, effects of excellent rolling resistance and wet skid resistance may be achieved.

In another embodiment, the modified conjugated diene-based polymer may have molecular weight distribution (Mw/Mn) of 0.5 to 10, 0.5 to 5, 1.0 to 3.0, or 1.0 to 2.0, and within this range, effect of excellent balance between physical properties may be achieved.

In another embodiment, the modified conjugated diene-based polymer may have mooney viscosity of 40 to 90, 45 to 85, or 50 to 80 at 100° C., and within this range, effects of excellent processability and productivity may be achieved.

In addition, the modified conjugated diene-based polymer may have a vinyl content of 18 wt % or more, 25 wt % or more, or 30 wt % to 70 wt %, and within this range, the glass transition temperature may be adjusted in an appropriate range, and effects of excellent rolling resistance, wet skid resistance and a low fuel consumption ratio may be achieved. Here, the vinyl content may mean the amount of not 1,4-added but 1,2-added conjugated diene-based monomer based on 100 wt % of a conjugated diene-based copolymer composed of a monomer having a vinyl group and an aromatic vinyl-based monomer.

Meanwhile, the term "derived repeating unit" and "derived functional group" in the present invention may represent a component or a structure comes from a certain material, or the material itself.

A method for preparing a modified conjugated diene-based polymer according to the present invention may include a step of polymerizing conjugated diene-based monomers, or an aromatic vinyl-based monomer and a conjugated diene-based monomer, in a hydrocarbon solvent including an organometal compound, to prepare an active polymer which is coupled with an organometal (S1); and a step of reacting the active polymer and a modifier which includes a compound represented by the following Formula 1 (S2):

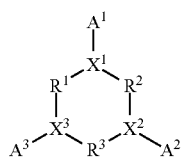

[Formula 1]

The definition of each substituent of Formula 1 is the same as defined above.

The hydrocarbon solvent is not specifically limited, but may be, for example, one or more selected from the group consisting of n-pentane, n-hexane, n-heptane, isooctane, cyclohexane, toluene, benzene and xylene.

According to an embodiment of the present invention, the compound represented by Formula 1 may be used in an amount of 0.01 mmol to 10 mmol, or 0.5 mmol to 5 mmol per 100 g of a monomer mixture.

According to an embodiment of the present invention, the organometal compound may be used in 0.01 mmol to 10 mmol, 0.05 mmol to 5 mmol, 0.1 mmol to 2 mmol, or 0.1 mmol to 1 mmol per 100 g of a monomer mixture.

The organometal compound may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

In another embodiment, the organometal compound may be a compound represented by the following Formula 2:

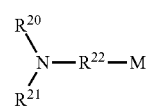

[Formula 2]

In Formula 2, the definition of each substituent is the same as defined above.

Meanwhile, the polymerization of step (S1) may be performed by including a polar additive, and the polar additive may be added in an amount of 0.001 g to 50 g, 0.001 g to 10 g, or 0.005 g to 0.1 g per 100 g of a monomer mixture. In addition, the polar additive may be one or more selected from the group consisting of tetrahydrofuran, ditetrahydrofurylpropane, diethyl ether, cycloamyl ether, dipropyl ether, ethylene dimethyl ether, diethyl glycol, dimethyl ether, tert-butoxy ethoxy ethane, bis(3-dimethylaminoethyl) ether, (dimethylaminoethyl) ethyl ether, trimethylamine, triethylamine, tripropylamine, and tetramethylethylenediamine, preferably, triethylamine or tetramethylethylenediamine, and may be the same as or different from a polar additive which may be injected during preparing the aminosilane-based compound. If the polar additive is included and conjugated diene-based monomers, or a conjugated diene-based monomer and an aromatic vinyl-based monomer are copolymerized, the reaction rates thereof may be compensated, and effect of inducing the easy formation of a random copolymer may be achieved.

The polymerization of step (S1) may be, for example, an anionic polymerization, and particularly, a living anionic polymerization by which an anionic active part is formed at the polymerization terminal through a propagation reaction by anions. In addition, the polymerization of step (S1) may be a polymerization with heating, an isothermal polymerization, or a polymerization at a constant temperature (adiabatic polymerization). The polymerization at a constant temperature means a polymerization method including a step of polymerizing using self-generated heat of reaction without optionally applying heat after adding an organometal compound, and the polymerization with heating means a polymerization method including injecting the organometal compound and then, increasing the temperature by optionally applying heat. The isothermal polymerization means a polymerization method by which the temperature of a polymer is kept constant by increasing heat by applying heat or taking heat after adding the organometal compound. In addition, the polymerization of step (S1) may be conducted in a temperature range of −20° C. to 200° C., 0° C. to 150° C., or 10° C. to 120° C.

The active polymer prepared by step (S1) may mean a polymer in which a polymer anion and an organometallic cation are coupled.

According to an embodiment of the present invention, the molar ratio of the modifier including the compound represented by Formula 1 and the organometal compound may be from 1:0.1 to 1:10, 1:0.1 to 1:5, or 1:0.5 to 1:2, and within this range, modification reaction may be performed with optimal performance, and a conjugated diene-based polymer with a high modification ratio may be obtained.

The reaction of step (S2) is modification reaction for introducing the functional group derived from the modifier into an active polymer, and may be performed at 0° C. to 90° C. for 1 minute to 5 hours.

In addition, according to an embodiment of the present invention, the method for preparing a modified conjugated diene-based polymer may be performed by a batch type polymerization method or a continuous type polymerization method including one or more reactors.

The method for preparing a modified conjugated diene-based polymer may further include, for example, one or more steps among recovering and drying steps of a solvent and an unreacted monomer after step (S2) of the present invention according to need.

A modifier according to the present invention may include a compound represented by the following Formula 1:

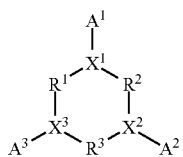

[Formula 1]

In Formula 1, the definition on each substituent is the same as defined above.

The modifier of the present invention includes an amine group in a molecule and makes excellent interaction with an inorganic filler, specifically, a silica-based filler.

According to the present invention, a rubber composition including the modified conjugated diene-based polymer is provided.

The rubber composition may include the modified conjugated diene-based polymer in an amount of 0.1 wt % or more, 10 wt % to 100 wt %, or 20 wt % to 90 wt %. Within the range, effects of excellent mechanical properties such as tensile strength and abrasion resistance, and excellent balance between each of physical properties may be achieved.

In addition, the rubber composition may further include other rubber components, if necessary, in addition to the modified and conjugated diene-based polymer, and, in this case, the rubber component may be included in an amount of 90 wt % or less based on the total weight of the rubber composition. Particularly, the other rubber components may be included in an amount of 1 part by weight to 900 parts by weight based on 100 parts by weight of the modified and conjugated diene-based copolymer.

The rubber component may be, for example, a natural rubber or a synthetic rubber, particularly, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a polyethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture of two or more thereof may be used.

The rubber composition may, for example, include 0.1 parts by weight to 200 parts by weight, 0.1 parts by weight to 150 parts by weight, or 10 parts by weight to 120 parts by weight of a filler based on 100 parts by weight of the modified conjugated diene-based polymer of the present invention. The filler may particularly be, for example, a silica-based filler, particularly, wet silica (hydrated silicate), dry silica (anhydrous silicate), calcium silicate, aluminum silicate, or colloid silica. Preferably, the filler may be wet silica which has the most significant compatible effect of improving effect of destruction characteristics and wet grip. In addition, the rubber composition may further include a carbon black-based filler, if needed.

In another embodiment, if silica is used as the filler, a silane coupling agent for the improvement of reinforcing and low exothermic properties may be used together. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used.

Preferably, the silane coupling agent may be bis(3-triethoxysilylpropyl)polysulfide or 3-trimethoxysilylpropylbenzothiazyltetrasulfide in consideration of the improving effect of reinforcing properties.

In addition, in the rubber composition according to an embodiment of the present invention, a modified conjugated diene-based polymer in which a functional group having high affinity with silica is introduced into an active part as a rubber component is used, and the mixing amount of a silane coupling agent may be smaller than a common case. Accordingly, the silane coupling agent may be used in an amount of 1 part by weight to 20 parts by weight, or 5 parts by weight to 15 parts by weight based on 100 parts by weight of silica, and within this range, effect as a coupling agent may be sufficiently exhibited, and the gelation of the rubber component may be prevented.

The rubber composition according to an embodiment of the present invention may be sulfur crosslinkable, and may further include a vulcanizing agent. The vulcanizing agent may particularly be a sulfur powder and may be included in an amount of 0.1 parts by weight to 10 parts by weight based on 100 parts by weight of a rubber component. With the amount in the above range, elasticity and strength required for a vulcanized rubber composition may be secured, and at the same time, a low fuel consumption ratio may be excellent.

The rubber composition according to an embodiment of the present invention may further include various additives used in a common rubber industry in addition to the above-described components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may use, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), and may be included in an amount of 0.1 parts by weight to 5 parts by weight based on 100 parts by weight of the rubber component.

The process oil acts as a softener in a rubber composition and may include, for example, a paraffin-based, naphthene-based, or aromatic compound, and an aromatic process oil may be used in consideration of tensile strength and abrasion resistance, and a naphthene-based or paraffin-based process oil may be used in consideration of hysteresis loss and properties at a low temperature. The process oil may be included, for example, in an amount of 100 parts by weight or less based on 100 parts by weight of the rubber component. With the amount in the above-described range, the deterioration of tensile strength and low exothermic properties (low fuel consumption ratio) of the vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, and may used in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to mixing prescription. In addition, a rubber composition having low exothermic properties and good abrasion resistance may be obtained by a vulcanization process after a molding process.

Therefore, the rubber composition may be useful to the manufacture each member for tires such as a tire tread, an under tread, a side wall, a carcass coating rubber, a belt coating rubber, a bead filler, a chafer, and a bead coating rubber, or to the manufacture of rubber products in various industries such as a dustproof rubber, a belt conveyor, and a hose.

Also, the present invention provides a tire manufactured using the rubber composition.

The tire may include a tire or a tire tread.

Hereinafter, the present invention will be explained in more detail referring to embodiments. However, the following embodiments are only for the illustration of the present invention, and the scope of the present invention is not limited thereto.

EXAMPLES

Example 1

To a 20 L autoclave reactor, 270 g of styrene, 710 g of 1,3-butadiene, 5,000 g of n-hexane, and 1.5 g of ditetrahydrofurylpropane as a polar additive were added, and the internal temperature of the reactor was elevated to 40° C. When the internal temperature of the reactor reached 40° C., 4 mmol of n-butyllithium was injected into the reactor, and an adiabatic reaction with heating was performed. After about 20 minutes from the completion of the adiabatic reaction with heating, 20 g of 1,3-butadiene was injected for capping the terminal of a polymer with butadiene. After 5 minutes, 4.8 mmol of a compound represented by Formula 1-1 below was injected, and the reaction was performed for 15 minutes. Then, the polymerization reaction was quenched using ethanol, and 45 ml of a solution in which butylated hydroxytoluene (BHT) was dissolved in hexane as an antioxidant by 0.3 wt %, was added thereto. The polymer thus obtained was added to hot water heated using steam and stirred to remove solvents, followed by roll drying to remove remaining solvents and water to prepare a modified conjugated diene-based polymer.

[Formula 1-1]

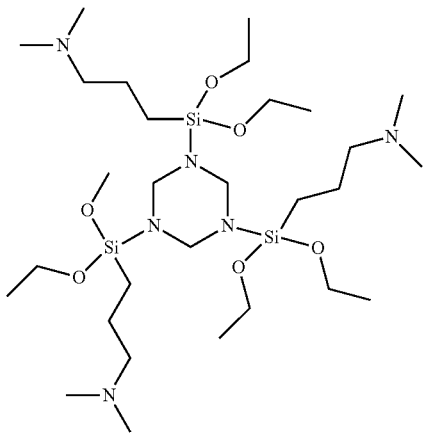

Example 2

The same method as in Example 1 was conducted except for injecting 4.8 mmol of a compound represented by Formula 1-2 below instead of the compound represented by Formula 1-1 and reacting for 15 minutes in Example 1.

[Formula 1-2]

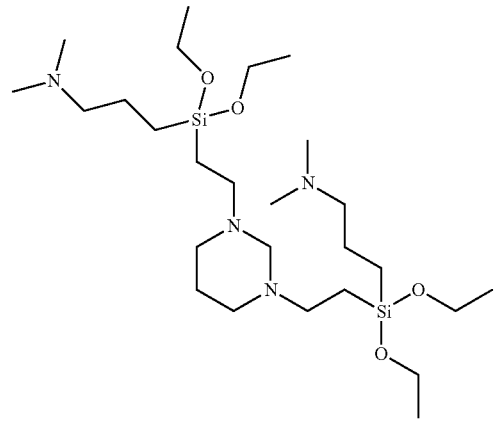

Example 3

The same method as in Example 1 was conducted except for injecting 4.8 mmol of a compound represented by Formula 1-3 below instead of the compound represented by Formula 1-1 and reacting for 15 minutes in Example 1.

[Formula 1-3]

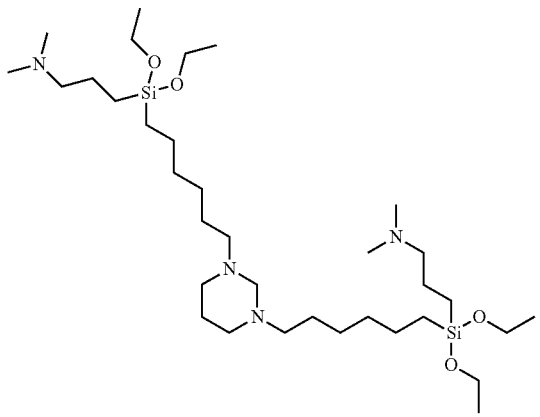

Comparative Example 1

To a 20 L autoclave reactor, 270 g of styrene, 710 g of 1,3-butadiene, 5,000 g of n-hexane, and 1.5 g of ditetrahydrofurylpropane as a polar additive were added, and the internal temperature of the reactor was elevated to 40° C. When the internal temperature of the reactor reached 40° C., 4 mmol of n-butyllithium was injected into the reactor, and an adiabatic reaction with heating was performed. After about 20 minutes from the completion of the adiabatic reaction with heating, 20 g of 1,3-butadiene was injected for capping the terminal of a polymer with butadiene. Then, the polymerization reaction was quenched using ethanol, and 45 ml of a solution in which butylated hydroxytoluene (BHT) was dissolved in hexane as an antioxidant by 0.3 wt %, was added thereto. The polymer thus obtained was added to hot water heated using steam and stirred to remove solvents, followed by roll drying to remove remaining solvents and water to prepare an unmodified conjugated diene-based polymer.

Comparative Example 2

The same method as in Example 1 was conducted except for injecting 4.8 mmol of dimethyl dichlorosilane instead of Formula 1-1 and reacting for 15 minutes in Example 1.

Comparative Example 3

The same method as in Example 1 was conducted except for injecting 4.8 mmol of dimethoxy dichlorosilane instead of Formula 1-1 and reacting for 15 minutes in Example 1.

EXPERIMENTAL EXAMPLES

Experimental Example 1

With respect to each of modified or unmodified conjugated diene-based polymers prepared in the examples and comparative examples, a weight average molecular weight (Mw, ×10$^4$ g/mol), a number average molecular weight (Mn, ×10$^4$ g/mol), molecular weight distribution (MWD), and mooney viscosity (MV) were measured. The results are listed in Table 1 below.

The weight average molecular weight (Mw) and the number average molecular weight (Mn) were measured by gel permeation chromatography (GPC) analysis, and the molecular weight distribution (MWD, Mw/Mn) was obtained by the calculation from each of the measured molecular weights. Particularly, GPC was conducted using two columns of PLgel Olexis (Polymer Laboratories Co. Ltd.) and one column of PLgel mixed-C (Polymer Laboratories Co. Ltd.) in combination, newly replaced columns were all mixed bed type columns, and polystyrene (PS) was used as a GPC standard material for calculating the molecular weights.

The mooney viscosity (MV, (ML1+4, @100° C.) MU) was measured by using MV-2000 (ALPHA Technologies Co., Ltd.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for measurement for 4 minutes.

TABLE 1

| Division | Example | | | Comparative Example | | |
|---|---|---|---|---|---|---|
| | 1 | 2 | 3 | 1 | 2 | 3 |
| M:PI | 1.2:1 | 1.2:1 | 1.2:1 | — | 1.2:1 | 1.2:1 |
| Modifier or coupling agent | A | B | C | — | D | E |
| Mw (×10$^4$ g/mol) | 49.5 | 50.8 | 50.6 | 52.0 | 46.7 | 48 |
| Mn (×10$^4$ g/mol) | 33.0 | 31.2 | 33.4 | 35.0 | 30.0 | 31.3 |
| MWD (Mw/Mn) | 1.5 | 1.6 | 1.5 | 1.5 | 1.6 | 1.5 |
| MV (ML1 + 4, @100° C.) | 62 | 60 | 59 | 61 | 58 | 58 |

\* M:PI is a molar ratio of a modifier (or coupling agent) and a polymerization initiator (molar ratio of modifier:act. Li)
\* Modifier A: Formula 1-1
\* Modifier B: Formula 1-2
\* Modifier C: Formula 1-3
\* Coupling agent D: dimethyl dichlorosilane
\* Coupling agent E: dimethoxy dichlorosilane

Experimental Example 2

In order to comparatively analyze the physical properties of a rubber composition including each of modified or unmodified conjugated diene-based copolymers prepared in the examples and comparative examples and a molded article manufactured therefrom, tensile properties, abrasion resistance and wet skid resistance were measured, respectively, and the results are listed in Table 3 below.

1) Preparation of Rubber Specimen

By using each of modified or unmodified conjugated diene-based copolymers prepared in the examples and comparative examples as a raw rubber, mixing was performed according to the mixing conditions shown in Table 2 below. The raw material in Table 2 is represented by parts by weight based on 100 parts by weight of rubber.

TABLE 2

| Division | Raw material | Amount (parts by weight) |
|---|---|---|
| First stage mulling | Rubber (including process oil) | 137.5 |
| | Silica | 70.0 |
| | Coupling agent | 11.2 |
| | Zinc white | 3.0 |
| | Stearic acid | 2.0 |
| | Antioxidant | 2.0 |
| | Antiaging agent | 2.0 |
| | Wax | 1.0 |
| | Rubber accelerator | 1.75 |

TABLE 2-continued

| Division | Raw material | Amount (parts by weight) |
|---|---|---|
| Second stage mulling | Sulfur | 1.5 |
| | Vulcanization accelerator | 2.0 |

Particularly, the rubber specimen was mulled via a first stage mulling and a second stage mulling. In the first stage mulling, a raw rubber (styrene-butadiene copolymer), a filler, an organosilane coupling agent, a process oil, a zinc white, stearic acid, an antioxidant, an antiaging agent, wax and an accelerator were mixed and mulled by using a banbury mixer equipped with a temperature controlling apparatus. In this case, the temperature of the mulling apparatus was controlled, and a first compound mixture was obtained at a discharge temperature of 145° C. to 155° C. In the second stage mulling, the first compound mixture was cooled to room temperature, and the first compound mixture, sulfur and a vulcanization accelerator were added to the mulling apparatus and mixed at a temperature of 100° C. or less to obtain a second compound mixture. Then, a curing process was performed at 100° C. for 20 minutes to manufacture a rubber specimen.

2) Tensile Properties

The tensile properties were measured by manufacturing each specimen for test and measuring tensile strength when breaking and tensile stress when elongating by 300% (300% modulus) of each specimen according to an ASTM 412 tensile test method. Particularly, tensile properties were measured by using a Universal Test machine 4204 tensile tester (Instron Co., Ltd.) at room temperature at a rate of 50 cm/min. Each resultant value was shown after indexing by setting the resultant value of Comparative Example 1 as 100.

3) Viscoelasticity Properties

Viscoelasticity properties were obtained by measuring tan δ while changing deformation at each measurement temperature (−60° C. to 60° C.) and a frequency of 10 Hz with a twist mode by using a dynamic mechanical analyzer (TA Co., Ltd.). If tan δ at a low temperature of 0° C. is high, it means that wet skid resistance is good, and if tan δ at a high temperature of 60° C. is high, it means that hysteresis loss is small and a fuel consumption ratio is excellent.

TABLE 3

| | | Example | | | Comparative Example | | |
|---|---|---|---|---|---|---|---|
| Division | | 1 | 2 | 3 | 1 | 2 | 3 |
| Tensile properties | 300% modulus (kgf/cm$^2$) | 115 | 114 | 112 | 100 | 101 | 103 |
| | Tensile strength (kgf/cm$^2$) | 125 | 120 | 122 | 100 | 102 | 102 |
| Viscoelasticity (Index) | tan δ @0° C. | 110 | 106 | 107 | 100 | 99 | 99 |
| | tan δ @60° C. | 104 | 105 | 108 | 100 | 101 | 100 |

As shown in Table 3, the modified conjugated diene-based polymers according to the present invention were found to have improved 300% modulus and tensile strength and thus, excellent tensile properties when compared to Comparative Example 1 which was an unmodified conjugated diene-based polymer. Since 0° C. tan δ was high, and wet skid resistance was high if the modified conjugated diene-based polymer of the present invention was included in a tire. Also, since 60° C. tan δ was high, and rolling resistance was improved and fuel consumption efficiency was excellent.

In addition, the modified conjugated diene-based polymers of Example 1 to Example 3 according to the present invention were verified to have markedly improved tensile properties and viscoelasticity properties when compared to the modified conjugated diene-based polymers of Comparative Example 2 and Comparative Example 3.

Meanwhile, with respect to the viscoelasticity properties, the properties of improving a tan δ value at 0° C. and a tan δ value at 60° C. at the same time are commonly known to be very difficult, and through the results in Table 3, the viscoelasticity properties of the modified conjugated diene-based polymers of Example 1 to Example 3 according to the present invention were found to be very good.

The invention claimed is:

1. A modified conjugated diene-based polymer comprising a repeating unit derived from a conjugated diene-based monomer, and comprising at one terminal, a functional group derived from a modifier which comprises, a compound represented by the following Formula 1:

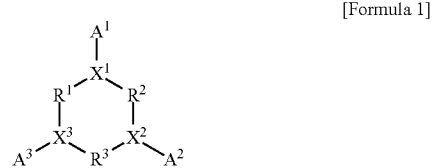

[Formula 1]

in Formula 1, $X^1$ to $X^3$ are each independently A N atom or $CR^{16}$, where at least one of $X^1$ to $X^3$ is a N atom, and $R^{16}$ is a hydrogen atom or a monovalent hydrocarbon group of 1 to 30 carbon atoms, $R^1$ to $R^3$ are each independently a divalent hydrocarbon group of 1 to 10 carbon atoms, and $A^1$ to $A^3$ are each independently a hydrogen atom, or a functional group represented by the following Formula 1b, where at least one of $A^1$ to $A^3$ is the functional group represented by the following Formula 1b,

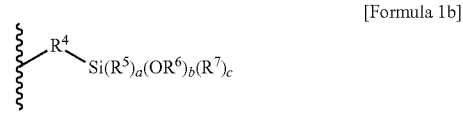

[Formula 1b]

in Formula 1b, $R^4$ is a single bond, or a divalent hydrocarbon group of 1 to 10 carbon atoms, $R^5$ and $R^6$ are each independently a monovalent hydrocarbon group of 1 to 30 carbon atoms, $R^7$ is each independently a monovalent hydrocarbon group of 1 to 30 carbon atoms, or a functional group represented by the following Formula 1a, where at least one $R^7$ is the functional groups represented by the following Formula 1a, and a is an integer of 0 or 1, b is an integer selected from 1 or 2, and c is an integer selected from 1 or 2, where a+b+c=3,

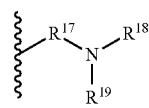

[Formula 1a]

in Formula 1a, $R^{17}$ is a divalent hydrocarbon group of 1 to 10 carbon atoms, and $R^{18}$ and $R^{19}$ are each independently a monovalent hydrocarbon group of 1 to 30 carbon atoms.

2. The modified conjugated diene-based polymer of claim 1, wherein in Formula 1, at least two of $X^1$ to $X^3$ are N atoms, $R^1$ to $R^3$ are each independently a divalent linear hydrocarbon group of 1 to 5 carbon atoms, at least two of $A^1$ to $A^3$ are the functional group represented by Formula 1b, $R^4$ is a single bond, or a divalent linear hydrocarbon group of 1 to 5 carbon atoms, $R^5$ and $R^6$ are each independently a monovalent hydrocarbon group of 1 to 20 carbon atoms, and $R^7$ is each independently a monovalent hydrocarbon group of 1 to 20 carbon atoms, or the functional group represented by Formula 1a, where two $R^7$ are the functional group represented by Formula 1a, and in Formula 1a, $R^{17}$ is a divalent linear hydrocarbon group of 1 to 5 carbon atoms, and $R^{18}$ and $R^{19}$ are each independently a monovalent hydrocarbon group of 1 to 20 carbon atoms.

3. The modified conjugated diene-based polymer of claim 1, wherein in Formula 1, $X^1$ to $X^3$ are each independently a N atom, $R^1$ to $R^3$ are each independently a divalent hydrocarbon group of 1 to 3 carbon atoms, at least two of $A^1$ to $A^3$ are the functional group represented by Formula 1b, $R^4$ is a single bond, $R^6$ is a monovalent hydrocarbon group of 1 to 10 carbon atoms, $R^7$ is each independently the functional group represented by Formula 1a, and a is 0, and in Formula 1a, $R^{17}$ is a divalent linear hydrocarbon group of 1 to 5 carbon atoms, and $R^{18}$ and $R^{19}$ are each independently a monovalent hydrocarbon group of 1 to 10 carbon atoms.

4. The modified conjugated diene-based polymer of claim 1, wherein the compound represented by Formula 1 is a compound represented by the following Formula 1-1, Formula 1-2 or Formula 1-3:

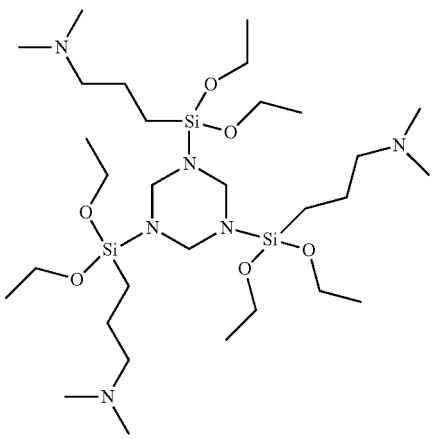

[Formula 1-1]

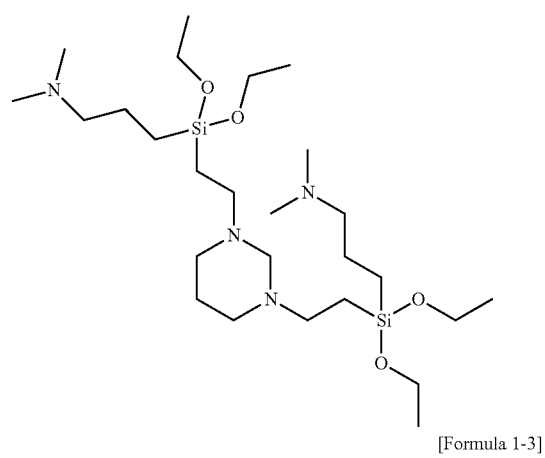

[Formula 1-2]

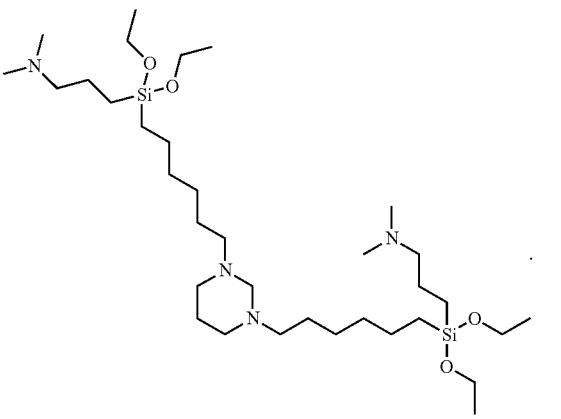

[Formula 1-3]

5. The modified conjugated diene-based polymer of claim 1, wherein the modified conjugated diene-based polymer further comprises a repeating unit derived from an aromatic vinyl monomer.

6. The modified conjugated diene-based polymer of claim 1, wherein the modified conjugated diene-based polymer has a number average molecular weight (Mn) of 10,000 g/mol to 2,000,000 g/mol.

7. The modified conjugated diene-based polymer of claim 1, wherein the modified conjugated diene-based polymer has molecular weight distribution (Mw/Mn) of 1 to 10.

8. A modified conjugated diene-based polymer comprising a repeating unit derived from a conjugated diene-based monomer, comprising at one terminal, a functional group derived from a modifier which comprises a compound represented by the following Formula 1, and comprising at the other terminal, a functional group derived from a modification initiator represented by the following Formula 2:

[Formula 1]

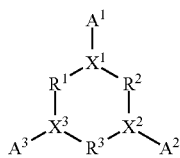

in Formula 1,
$X^1$ to $X^3$ are each independently a N atom or $CR^{16}$, where at least one of $X^1$ to $X^3$ is a N atom, and $R^{16}$ is a hydrogen atom or a monovalent hydrocarbon group of 1 to 30 carbon atoms,
$R^1$ to $R^3$ are each independently a divalent hydrocarbon group of 1 to 10 carbon atoms, and
$A^1$ to $A^3$ are each independently a hydrogen atom, or a functional group represented by the following Formula 1b, where at least one of $A^1$ to $A^3$ is the functional group represented by the following Formula 1b,

[Formula 1b]

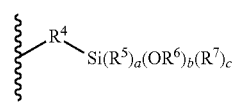

in Formula 1b,
$R^4$ is a single bond, or a divalent hydrocarbon group of 1 to 10 carbon atoms,
$R^5$ and $R^6$ are each independently a monovalent hydrocarbon group of 1 to 30 carbon atoms,
$R^7$ is each independently a monovalent hydrocarbon group of 1 to 30 carbon atoms, or a functional group represented by the following Formula 1a, where at least one $R^7$ is the functional group represented by the following Formula 1a, and
a is an integer of 0 or 1, b is an integer selected from 1 or 2, and c is an integer selected from 1 or 2, where a+b+c=3,

[Formula 1a]

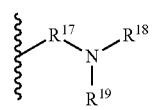

in Formula 1a,
$R^{17}$ is a divalent hydrocarbon group of 1 to 10 carbon atoms, and
$R^{18}$ and $R^{19}$ are each independently a monovalent hydrocarbon group of 1 to 30 carbon atoms,

[Formula 2]

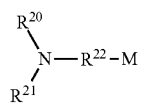

in Formula 2,
$R^{20}$ and $R^{21}$ are each independently one selected from the group consisting of an alkyl group of 1 to 20 carbon atoms, a cycloalkyl group of 3 to 20 carbon atoms, and an aralkyl group of 5 to 20 carbon atoms, or $R^{20}$ and $R^{21}$ together with an adjacent N atom are combined with each other to form a saturated or unsaturated cyclic structure of 5 to 20 carbon atoms, and
$R^{22}$ is a single bond, an alkylene group of 1 to 20 carbon atoms, or one linker selected from the group consisting of the following Formulae 3 to 5:

[Formula 3]

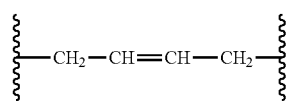

[Formula 4]

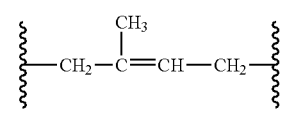

[Formula 5]

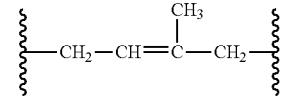

where M is an alkali metal.

9. The modified conjugated diene-based polymer of claim 8, wherein
in Formula 1,
at least two of $X^1$ to $X^3$ are N atoms,
$R^1$ to $R^3$ are each independently a divalent linear hydrocarbon group of 1 to 5 carbon atoms,
at least two of $A^1$ to $A^3$ are the functional group represented by Formula 1b,
$R^4$ is a single bond, or a divalent linear hydrocarbon group of 1 to 5 carbon atoms,
$R^5$ and $R^6$ are each independently a monovalent hydrocarbon group of 1 to 20 carbon atoms, and
$R^7$ is each independently a monovalent hydrocarbon group of 1 to 20 carbon atoms, or the functional group represented by Formula 1a, where two $R^7$ the functional group represented by Formula 1a, and
in Formula 1a,
$R^{17}$ is a divalent linear hydrocarbon group of 1 to 5 carbon atoms, and
$R^{18}$ and $R^{19}$ are each independently a monovalent hydrocarbon group of 1 to 20 carbon atoms.

10. The modified conjugated diene-based polymer of claim 8, wherein
in Formula 1,
$X^1$ to $X^3$ are each independently a N atom,
$R^1$ to $R^3$ are each independently divalent hydrocarbon group of 1 to 3 carbon atoms,
at least two of $A^1$ to $A^3$ are the functional group represented by Formula 1b,
$R^4$ is a single bond,
$R^6$ is a monovalent hydrocarbon group of 1 to 10 carbon atoms,
$R^7$ is each independently the functional group represented by Formula 1a, and
a is 0, and
in Formula 1a,
$R^{17}$ is a divalent linear hydrocarbon group of 1 to 5 carbon atoms, and $R^{18}$ and $R^{19}$ are each independently a monovalent hydrocarbon group of 1 to 10 carbon atoms.

11. The modified conjugated diene-based polymer of claim 8, wherein the compound represented by Formula 1 is a compound represented by the following Formula 1-1, Formula 1-2 or Formula 1-3:

[Formula 1-1]

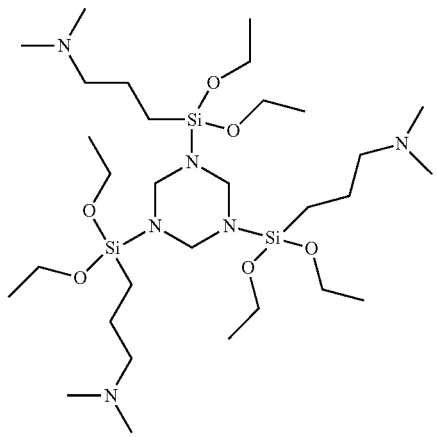

[Formula 1-2]

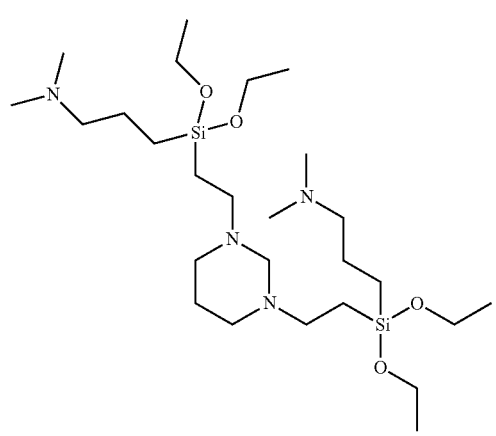

[Formula 1-3]

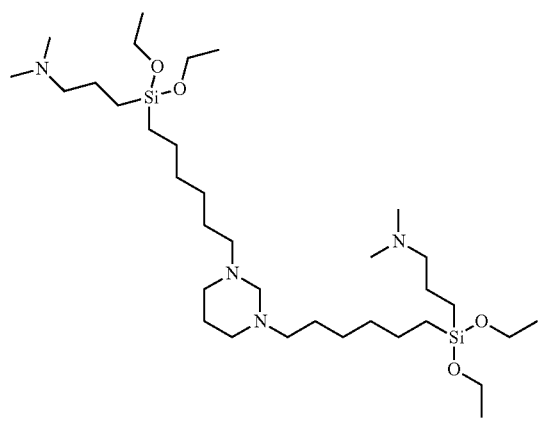

12. The modified conjugated diene-based polymer of claim 8, wherein the modified conjugated diene-based polymer further comprises a repeating unit derived from an aromatic vinyl monomer.

13. The modified conjugated diene-based polymer of claim 8, wherein the modified conjugated diene-based polymer has a number average molecular weight (Mn) of 10,000 g/mol to 2,000,000 g/mol.

14. The modified conjugated diene-based polymer of claim 8, wherein the modified conjugated diene-based polymer has molecular weight distribution (Mw/Mn) of 1 to 10.

15. A method for preparing a modified conjugated diene-based polymer, the method comprising:
polymerizing conjugated diene-based monomers, or an aromatic vinyl-based monomer and a conjugated diene-based monomer, in a hydrocarbon solvent which comprises an organometal compound, to prepare an active polymer which is coupled with an organometal (S1); and
reacting the active polymer and a modifier which comprises a compound represented by the following Formula 1 (S2):

[Formula 1]

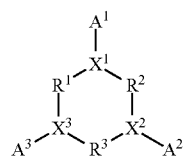

in Formula 1,
$X^1$ to $X^3$ are each independently a N atom or $CR^{16}$, where at least one of $X^1$ to $X^3$ is a N atom, and $R^{16}$ is a hydrogen atom or a monovalent hydrocarbon group of 1 to 30 carbon atoms,
$R^1$ to $R^3$ are each independently a divalent hydrocarbon group of 1 to 10 carbon atoms, and
$A^1$ to $A^3$ are each independently a hydrogen atom, or a functional group represented by the following Formula 1b, where at least one of $A^1$ to $A^3$ is the functional groups represented by the following Formula 1b,

[Formula 1b]

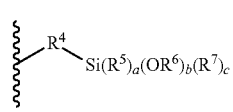

in Formula 1b,
$R^4$ is a single bond, or a divalent hydrocarbon group of 1 to 10 carbon atoms,
$R^5$ and $R^6$ are each independently a monovalent hydrocarbon group of 1 to 30 carbon atoms,
$R^7$ is each independently a monovalent hydrocarbon group of 1 to 30 carbon atoms, or a functional group represented by the following Formula 1a, where at least one $R^7$ is the functional group represented by the following Formula 1a, and
a is an integer of 0 or 1, b is an integer selected from 1 or 2, and c is an integer selected from 1 or 2, where a+b+c=3,

[Formula 1a]

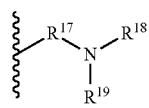

in Formula 1a,

R$^{17}$ is a divalent hydrocarbon group of 1 to 10 carbon atoms, and

R$^{18}$ and R$^{19}$ are each independently a monovalent hydrocarbon group of 1 to 30 carbon atoms.

16. The method for preparing a modified conjugated diene-based polymer of claim 15, wherein the organometal compound is used in 0.01 mmol to 10 mmol based on total 100 g of a monomer mixture.

17. The method for preparing a modified conjugated diene-based polymer of claim 15, wherein the organometal compound is one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium diisopropylamide.

18. The method for preparing a modified conjugated diene-based polymer of claim 15, wherein the organometal compound is a compound represented by the following Formula 2:

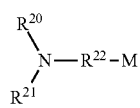

[Formula 2]

in Formula 2,

R$^{20}$ and R$^{21}$ are each independently one selected from the group consisting of an alkyl group of 1 to 20 carbon atoms, a cycloalkyl group of 3 to 20 carbon atoms, and an aralkyl group of 5 to 20 carbon atoms, or R$^{20}$ and R$^{21}$ together with an adjacent N atom are combined with each other to form a saturated or unsaturated cyclic structure of 5 to 20 carbon atoms, and R$^{22}$ is a single bond, an alkylene group of 1 to 20 carbon atoms, or one linker selected from the group consisting of the following Formulae 3 to 5,

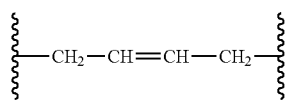

[Formula 3]

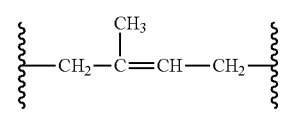

[Formula 4]

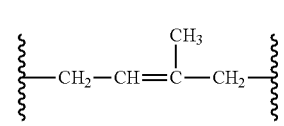

[Formula 5]

where M is an alkali metal.

19. The method for preparing a modified conjugated diene-based polymer of claim 15, wherein the polymerizing step (S1) is performed in the presence of a polar additive, and wherein the polar additive is one or more selected from the group consisting of tetrahydrofuran, ditetrahydrofurylpropane, diethyl ether, cycloamyl ether, dipropyl ether, ethylene dimethyl ether, diethyl glycol, dimethyl ether, tert-butoxy ethoxy ethane, bis(3-dimethylaminoethyl) ether, (dimethylaminoethyl) ethyl ether, trimethylamine, triethylamine, tripropylamine, and tetramethylethylenediamine.

20. A modifier comprising a compound represented by the following Formula 1:

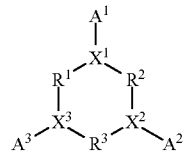

[Formula 1]

in Formula 1,

X$^1$ to X$^3$ are each independently a N atom or CR$^{16}$, where at least one of X$^1$ to X$^3$ is a N atom, and R$^{16}$ is a hydrogen atom or a monovalent hydrocarbon group of 1 to 30 carbon atoms, R$^1$ to R$^3$ are each independently a divalent hydrocarbon group of 1 to 10 carbon atoms, and A$^1$ to A$^3$ are each independently a hydrogen atom, or a functional group represented by the following Formula 1b, where at least one of A$^1$ to A$^3$ is the functional group represented by the following Formula 1b,

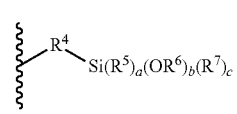

[Formula 1b]

in Formula 1b,

R$^4$ is a single bond, or a divalent hydrocarbon group of 1 to 10 carbon atoms, R$^5$ and R$^6$ are each independently a monovalent hydrocarbon group of 1 to 30 carbon atoms, R$^7$ is each independently a monovalent hydrocarbon group of 1 to 30 carbon atoms, or a functional group represented by the following Formula 1a, where at least one R$^7$ is the functional groups represented by the following Formula 1a, and a is an integer of 0 or 1, b is an integer selected from 1 or 2, and c is an integer selected from 1 or 2, where a+b+c=3,

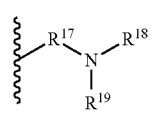

[Formula 1a]

in Formula 1a,

R$^{17}$ is a divalent hydrocarbon group of 1 to 10 carbon atoms, and

R$^{18}$ and R$^{19}$ are each independently a monovalent hydrocarbon group of 1 to 30 carbon atoms.

* * * * *